F. M. ROSS AND H. L. COOK.
RIM CONTRACTING OR EXPANDING TOOL.
APPLICATION FILED AUG. 6, 1917.
1,330,349.
Patented Feb. 10, 1920.
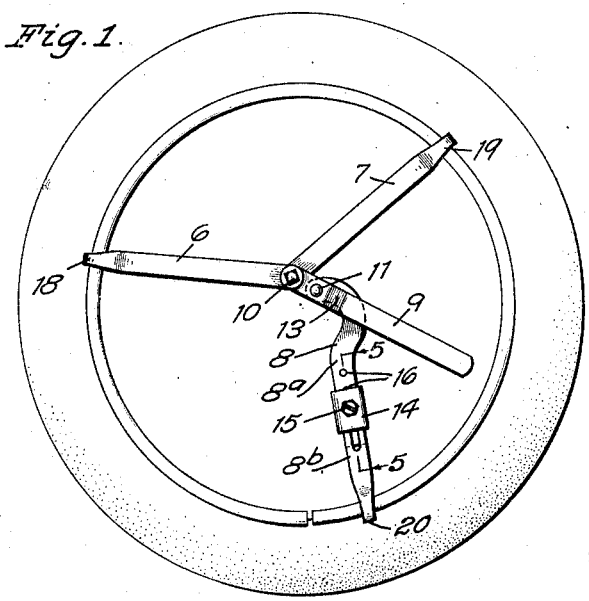
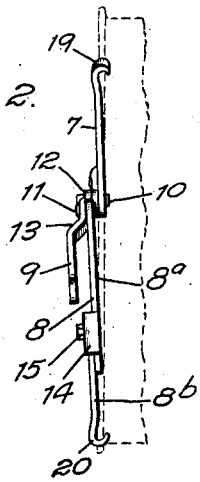
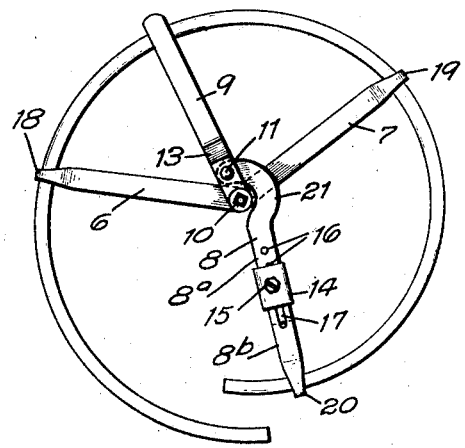
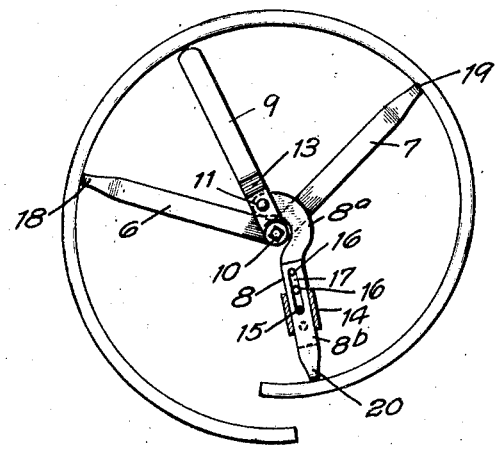
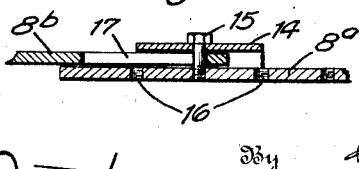
Witnesses:
F. E. Arthur,
W. Thornton Bogert
Inventor
Frederick M. Ross
Harry L. Cook
By Walter J. Murray
Attorney

UNITED STATES PATENT OFFICE.

FREDERICK M. ROSS AND HARRY L. COOK, OF CINCINNATI, OHIO; SAID COOK ASSIGNOR TO SAID ROSS.

RIM CONTRACTING OR EXPANDING TOOL.

1,330,349. Specification of Letters Patent. Patented Feb. 10, 1920.

Application filed August 6, 1917. Serial No. 184,573.

*To all whom it may concern:*

Be it known that we, FREDERICK M. ROSS and HARRY L. COOK, citizens of the United States of America, and residents of Cincinnati, in the county of Hamilton and State of Ohio, have invented a new and useful Improvement in Rim Contracting or Expanding Tools, of which the following is a specification.

An object of our invention is to produce a rim contracting or expanding tool adapted to break the joint and expand or contract split tire rims of the normally contracting or normally expanding type.

A further object is to produce an improved rim-contracting or expanding tool adapted to retain normally expanding tire mounting rims in their contracted condition.

These and other objects are attained in the rim contracting or expanding tool described in the following specification and illustrated in the accompanying drawings, in which;

Figure 1 is an elevational view of a tire rim having a tool embodying our invention mounted thereon, the rim and tool being shown in their expanded positions and with a tire mounted upon the rim.

Fig. 2 is a side elevation of the tool in its expanded position, the position of the rim being shown in dotted lines.

Fig. 3 is an elevational view of a normally expanding tire rim in its contracted position, the tool being mounted upon the rim and holding it in its contracted position.

Fig. 4 is an elevational view of a tire rim of the normally contracting type, a tool being mounted within the rim in position to expand it.

Fig. 5 is a detail sectional view taken on the line 5—5 of Fig. 1.

Our improved tool consists of a series of arms 6, 7 and 8 having a handle 9 for operating the arms. The inner ends of arms 6 and 7 and the inner end of handle 9 are pivotally connected by a bolt 10. The arm 8 is pivotally connected with handle 9 by means of a bolt 11 located a short distance from bolt 10. Handle 9 is spaced from arms 6 and 7 by means of an offset boss 12 which is of a thickness substantially equal to or greater than the thickness of arm 8. This is for a purpose to be hereinafter more fully explained. At a point 13 handle 9 is offset to remove it some distance from arm 8 so as to render the operation of the handle more convenient. Arm 8 consists of two pieces 8ª and 8ᵇ which are telescopically connected by means of a joint consisting of a guide 14 which is held in position on the arm by a bolt 15 which passes through any one of a series of apertures 16 to hold the bolt and guide in position, as well as passing through a slot 17 formed in portion 8ᵇ of arm 8 in a manner such as to permit of reciprocation of portion 8ᵇ. The outer ends of arms 6, 7 and 8 are provided with the respective hooks 18, 19 and 20 which are adapted to engage the rolled edge of the rim. Arms 6 and 7 are each made of a length equal to or less than the radius of the external diameter of the rim, so that they engage the rim at points such that their contraction has little tendency to move the ends of the rim toward each other. Portion 8ª of arm 8 is curved at a point 21 adjacent to its inner end for the purpose of permitting handle 9 to be moved to the position disclosed in Fig. 3 without having arm 8 come into engagement with spacing boss 12 of the tool. The curve 21 is of such a shape as to permit handle 9 to be moved to a position out of alinement with the direction of pull of arm 8, so that pivot pin 11 of arm 8 will lie beyond the bolt 10 and thereby exert an eccentric pull upon the handle so as to retain the tool in its contracted position.

In using our improved tool in contracting rims of the normally expanding type we preferably position arms 6, 7 and 8 at angles of approximately 120 degrees apart, arm 8 having its hooked end 20 engaging the rim adjacent to the end thereof which is to be contracted. This positions the tool upon the rim as disclosed in Fig. 1. Handle 9 is now operated to bring it to the position disclosed in Fig. 3 in which pivot pin 11 lies beyond bolt 10, the direction of pull upon arm 8 having been brought to lie beyond bolt 10 so as to retain the tool in the position shown in Fig. 3. The rim will be retained in this position as long as the handle is allowed to remain with pivot pin 11 beyond bolt 10. As soon as it is desired to replace the tire it is but necessary to position it upon the rim and to move handle 9 away from its eccentric position to allow the rim to again expand and engage the tire as shown in Fig. 1, at which time the tool may be removed.

In using our improved tool to contract rims of the normally contracting type, it is but necessary to place the hooked ends of the arms 6 and 7 about 120 degrees apart, as shown in Fig. 1, and place arm adjacent to the split in the rim, then by moving the handle toward the position disclosed in Fig. 3, the end of the rim will move radially and the opposite end of the rim will have practically no circumferential movement. This will prevent jamming of the ends and promote the movement of one end past the other. In rims in which both a transverse and a radial movement of the ends of the rim is desired, arm 5 may be placed so as to face hook 20 in a direction opposite to that of hooks 18 and 19. In replacing a tire upon a rim of the normally contracting type it is necessary to position the tire properly thereon and to place the tool within the rim so that the hooked ends of its arms abut the inner surface of the rim as shown in Fig. 4. It is at this time that the lost motion connection between portions $8^a$ and $8^b$ of arm 8 comes into action. Portion $8^b$ telescopes with relation to portion $8^a$ to permit the tool to be located within the rim, the hooked ends of the arms being in engagement with the inner surface of the rim. The rim is now expanded by moving handle 9 from the position disclosed in Fig. 4 to the position in which its connected arms are expanded with the ends of the rim once more in alinement with one another. The rim having thus been expanded the tool is removed by collapsing it.

To adapt the tool to usage on rims of different sizes, the cap screw 15 may be mounted in any one of the apertures 16 so as to increase or decrease the size of the tool. It will be observed that the extensible members $8^a$ and $8^b$, after the pin 15 is adjusted to make the entire arm 8 the proper length, are freely slidable one upon the other so that to adjust the device for use in the manner shown in Fig. 4, that is, for expanding a normally-contractile rim, it is simply necessary to slide the outer section $8^b$ inwardly to the limit of its movement, thereby avoiding the use of set-screws or other locking devices. It will be observed also that to reverse the outer, hook-carrying, member $8^b$, it is simply necessary to unscrew the bolt 15, withdraw said member $8^b$, turn it around and reinsert it into the keeper 14 and then replace the bolt, so that it will be seen that the apparatus may be readily adjusted for use on various types of rims.

It will be observed also that a feature of great importance in my device is not only that the arm 8 shall be pivoted to the lever 9 at a point between its supporting-pivot 10 and its grasping-end, but also that said arm 8 shall be curved or bent at 21 in such manner that when the handle is operated to contract the rim, said bent or curved part 21 will permit the handle to swing far enough around to carry the pivot 11 to or beyond center, that is, to or beyond a line drawn through the central pivot 10 and the point of engagement of the hook 20, so that the parts are self-locked in their contracted position, the expansible force of the rim serving to hold the parts on the rim in locked relation, as shown in Fig. 3, whereby a separate locking device is avoided and whereby also convenience in handling the device and in operating it will be greatly facilitated.

Having thus described our invention, what we claim is:

1. In a rim tool, the combination of a pair of hooked spacing arms, pivotal means connecting their inner ends, a lever pivotally connected at its inner end to said pivotal means, and a third combined rim-contracting and rim-expanding arm pivotally connected to said lever at a point between the ends thereof, this rim-engaging arm having a bend formed in it near its pivotal end, the arrangement being such that the first-named two arms may engage a wheel-rim at spaced points on one side of the center and the third arm engage the rim on the opposite side of said center, and the point of the engagement of the pivot of this third arm and the pivot of the two first-named arms being such that they will be brought into alinement with the point of engagement of the third arm on the rim and then slightly therepast to lock the parts.

2. In a rim tool, the combination of a pair of hooked spacing arms, pivotal means connecting their inner ends, a lever pivotally connected at its inner end to said pivotal means, and a combined rim-contracting and rim-expanding arm pivotally connected to said lever at a point between the ends thereof, this rim-engaging arm having a bend formed in it near its pivotal end for the purpose set forth, said rim-engaging arm being composed of two freely slidable sections to enable the arm to be extended or shortened, for the purpose set forth.

3. In a rim tool, the combination of a pair of hooked spacing arms, pivotal means connecting their inner ends, a lever pivotally connected at its inner end to said pivotal means, and a combined rim-contracting and rim-expanding arm pivotally connected to said lever at a point between the ends thereof, this rim-engaging arm having a bend formed in it near its pivotal end for the purpose set forth, said rim-engaging arm being composed of a pair of freely slidable sections and means whereby the limit of movement of one section on the other may be varied.

4. In a rim tool, the combination of a pair of hooked spacing arms, pivotal means connecting their inner ends, a lever pivotally connected at its inner end to said pivotal means, and a combined rim-contracting and rim-expanding arm pivotally connected to said lever at a point between the ends thereof, this rim-engaging arm having a bend formed in it near its pivotal end for the purpose set forth, said rim-engaging arm consisting of two freely slidable sections, the outer one being provided with a rim-engaging hook and being reversible so as to adapt the hook to be engaged in one edge or the other of the rim, for the purpose set forth.

In testimony whereof we have hereunto subscribed our names this 2nd day of August, 1917.

FREDERICK M. ROSS.
HARRY L. COOK.

Witnesses:
W. THORNTON BOGERT,
WALTER F. MURRAY.